(12) United States Patent
Wang (10) Patent No.: US 8,499,322 B2
(45) Date of Patent: Jul. 30, 2013

(54) METHOD, SYSTEM AND APPARATUS FOR HIDING PROGRAMS

(75) Inventor: Jian Wang, Guangdong (CN)

(73) Assignee: Huawei Device Co., Ltd., Shenzhen (CN)

( * ) Notice: Subject to any disclaimer, the term of this patent is extended or adjusted under 35 U.S.C. 154(b) by 622 days.

(21) Appl. No.: 12/757,625

(22) Filed: Apr. 9, 2010

(65) Prior Publication Data

US 2010/0199315 A1   Aug. 5, 2010

Related U.S. Application Data

(63) Continuation of application No. PCT/CN2008/072743, filed on Oct. 17, 2008.

(30) Foreign Application Priority Data

Oct. 23, 2007   (CN) .......................... 2007 1 0165616

(51) Int. Cl.
- *G06F 3/00* (2006.01)
- *G06F 13/00* (2006.01)
- *H04N 5/445* (2011.01)

(52) U.S. Cl.
USPC .................. 725/45; 725/44; 725/46

(58) Field of Classification Search
None
See application file for complete search history.

(56) References Cited

U.S. PATENT DOCUMENTS

| | | | |
|---|---|---|---|
| 5,808,694 A * | 9/1998 | Usui et al. ....................... | 725/49 |
| 6,122,011 A * | 9/2000 | Dias et al. ...................... | 348/569 |
| 6,160,545 A * | 12/2000 | Eyer et al. ..................... | 715/721 |
| 6,904,609 B1 * | 6/2005 | Pietraszak et al. .............. | 725/39 |
| 6,934,963 B1 * | 8/2005 | Reynolds et al. ............... | 725/39 |
| 7,363,645 B1 * | 4/2008 | Hendricks ........................ | 725/41 |
| 7,882,440 B2 * | 2/2011 | Mohr ............................ | 715/746 |
| 8,381,249 B2 * | 2/2013 | Rasanen et al. .................. | 725/47 |
| 2002/0078453 A1 * | 6/2002 | Kuo ................................ | 725/46 |
| 2003/0127705 A1 | 7/2003 | Kwak et al. | |
| 2004/0117831 A1 * | 6/2004 | Ellis et al. ....................... | 725/53 |
| 2004/0158851 A1 | 8/2004 | Unemura | |

(Continued)

FOREIGN PATENT DOCUMENTS

| | | |
|---|---|---|
| CN | 1437406 A | 8/2003 |
| CN | 1555649 A | 12/2004 |

(Continued)

OTHER PUBLICATIONS

International Search Report in corresponding PCT Application No. PCT/CN2008/072743 (Jan. 22, 2009).

(Continued)

*Primary Examiner* — Brian Pendleton
*Assistant Examiner* — Jonathan V Lewis
(74) *Attorney, Agent, or Firm* — Leydig, Voit & Mayer, Ltd.

(57) ABSTRACT

The present invention discloses a method, a system and an apparatus for hiding programs. With the technology solution, which involves obtaining a sub-EPG identifier, receiving a total EPG, which contains sub-EPG identifiers and sub-EPGs each of which corresponds to one of the sub-EPG identifiers and which is transmitted by a central front end, searching the received total EPG for a sub-EPG corresponding to the obtained sub-EPG identifier and hiding programs based on the found sub-EPG. With technology solution, the program hiding is realized, and the regional program hiding and the programs hiding from particular subscribers may be realized.

13 Claims, 4 Drawing Sheets

U.S. PATENT DOCUMENTS

| | | |
|---|---|---|
| 2005/0097595 A1* | 5/2005 | Lipsanen et al. ............. 725/25 |
| 2005/0158014 A1 | 7/2005 | Choi et al. |
| 2006/0020973 A1* | 1/2006 | Hannum et al. ............ 725/46 |
| 2006/0218584 A1* | 9/2006 | Gildred ...................... 725/39 |
| 2007/0277199 A1* | 11/2007 | Yoon et al. ................. 725/39 |
| 2009/0031369 A1* | 1/2009 | Jeffs et al. ................. 725/87 |
| 2009/0100477 A1* | 4/2009 | Jeffs ........................... 725/86 |

FOREIGN PATENT DOCUMENTS

| | | |
|---|---|---|
| CN | 1589008 A | 3/2005 |
| CN | 1635790 A | 7/2005 |
| CN | 1645925 A | 7/2005 |
| CN | 1852419 A | 10/2006 |
| CN | 1933546 A | 3/2007 |
| CN | 101150708 A | 3/2008 |
| EP | 1 001 631 A1 | 11/1998 |
| EP | 0 912 054 A2 | 4/1999 |
| EP | 1 244 295 A2 | 9/2002 |
| JP | 2001136495 A | 5/2001 |
| WO | WO 03/084226 A1 | 10/2003 |
| WO | WO 2006/096483 A1 | 9/2006 |

OTHER PUBLICATIONS

3rd Office Action in corresponding Chinese Application No. 200710165616.4 (May 24, 2011).

$2^{nd}$ Office Action in corresponding Chinese Application No. 200710165616.4 (Feb. 23, 2011).

Written Opinion of the International Searching Authority in corresponding PCT Application No. PCT/CN2008/072743 (Jan. 22, 2009).

State Intellectual Property Office of the People's Republic of China, Examination Report in Chinese Patent Application No. 200710165616.4 (Jun. 4, 2009).

Communication in European Application No. 08851681.0-1522, mailed Sep. 24, 2010.

$1^{st}$ Office Action in corresponding European Patent Application No. 08851681.0 (Dec. 3, 2012).

* cited by examiner

METHOD, SYSTEM AND APPARATUS FOR HIDING PROGRAMS

CROSS-REFERENCE TO RELATED APPLICATIONS

This application is a continuation of International Application No. PCT/CN2008/072743, filed on Oct. 17, 2008, which claims priority to Chinese Patent Application No. 200710165616.4, filed on Oct. 23, 2007, both of which are hereby incorporated by reference in their entireties.

FIELD OF THE INVENTION

The invention relates to the field of digital television technology, and more particularly, to a method, a system and an apparatus for hiding programs.

BACKGROUND

With the increasing maturity of digital television technology, traditional analog television is translated to digital television on a large scale. During the translation, operators put forward various demands according to their own strategies. For example, to restrict watching ranges of some subscribers or adopt different charge standards in different areas, some programs are needed to be hidden from the subscribers, i.e., the subscribers are forbidden to watch these programs.

At present, there is a program hiding solution based on an authorization mechanism. In the solution, an efficient mechanism for charging is implemented by authorizing programs for each subscriber. A subscriber can only watch authorized programs. Although unauthorized programs may be searched for and stored, they can only be watched normally after these programs are paid and authorized. Therefore, through such solution, the subscribers may know the existence of the programs, but they need to pay to watch them.

If the television station does not desire that particular subscribers be aware of the existence of some special programs, the solution described above does not meet the requirements. Additionally, if the programs are required to be hidden from many subscribers in one group, each subscriber is required to be authorized through the solution, thus it is comparatively cumbersome to implement.

SUMMARY

An embodiment of the present invention provides a method for hiding programs from subscribers.

An embodiment of the present invention provides a system for hiding programs from subscribers.

An embodiment of the present invention provides a set-top box which is capable of hiding programs from subscribers.

An embodiment of the present invention provides a central front end which is capable of hiding programs from subscribers.

An embodiment of the present invention provides a sub front end which is capable of hiding programs from subscribers.

To achieve these objects, the technology solution of the present invention is implemented in the way described below.

The embodiment of the present invention discloses a method for hiding programs. The method includes:
obtaining a sub-electronic program guide (EPG) identifier;
receiving a total EPG transmitted by a central front end, where the total EPG includes a plurality of sub-EPG identifiers and sub-EPGs each of which corresponds to one of the sub-EPG identifiers; and
searching the received total EPG for a sub-EPG corresponding to the obtained sub-EPG identifier and hiding programs based on the sub-EPG.

The embodiment of the present invention discloses a system for hiding programs. The system includes a central front end and a receiving end sub-system.

The central front end is configured to transmit a total EPG, which includes a plurality of sub-EPG identifiers and sub-EPGs each of which corresponds to one of the sub-EPG identifiers, to the receiving end sub-system.

The receiving end sub-system is configured to obtain a sub-EPG identifier, search the total EPG transmitted by the central front end for a sub-EPG corresponding to the obtained sub-EPG identifier, and hide programs based on the sub-EPG.

The embodiment of the present invention discloses a set-top box. The set-top box includes an eigenvalue acquisition module, an EPG receiving module and a program hiding module.

The eigenvalue acquisition module is configured to acquire an eigenvalue and send it to the program hiding module.

The EPG receiving module is configured to receive a total EPG including the eigenvalue and its corresponding sub-EPG and send the total EPG to the program hiding module.

The program hiding module is configured to search the received total EPG for a sub-EPG corresponding to the received eigenvalue and hide programs based on the sub-EPG.

The embodiment of the present invention discloses a central front end comprising an assigning module and an EPG sending module.

The assigning module is configured to assign different eigenvalues to different set-top boxes of subscribers.

The EPG sending module is configured to send a total EPG, which includes the assigned eigenvalues and their corresponding sub-EPGs, to a set-top box of a subscriber.

The embodiment of the present invention discloses a sub front end. The sub front end is characterized by including a filter module.

The filter module is configured to receive a total EPG including the code of the respective sub front end and the sub-EPGs corresponding to the codes of the respective sub front ends, filter out all the sub-EPGs except a specified sub-EPG from the received total EPG, and transmit the filtered total EPG to a set-top box of a subscriber in a supervision area of the sub front end, the specified sub-EPG is the sub-EPG corresponding to the code of the sub front end.

It can be seen from the technology resolution described above, in the embodiment of the present invention, programs are hidden by using the technology resolution. The technology resolution involves: obtaining a sub-EPG identifier, receiving a total EPG, which includes sub-EPG identifiers and sub-EPGs each of which corresponds to one of the sub-EPG identifiers and which is transmitted by a central front end, searching the received total EPG for a sub-EPG corresponding to the obtained sub-EPG identifier and hiding programs based on the found sub-EPG.

DETAILED DESCRIPTION

Figure 1:
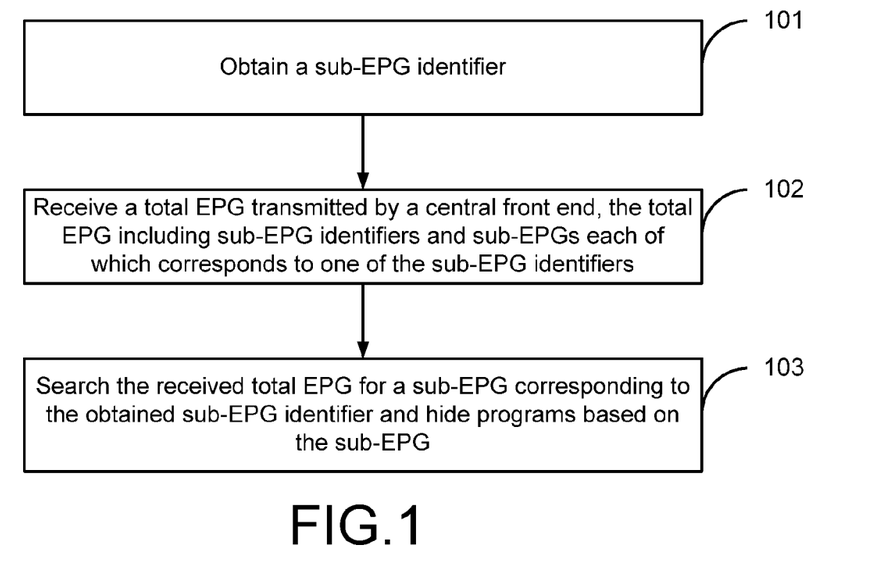
FIG. 1 is a flow chart of a method for hiding programs in accordance with one embodiment of the present invention.

FIG. 1 is a flow chart of a method for hiding programs in accordance with one embodiment of the present invention. As shown in FIG. 1, the method includes the following steps:

Step 101: Obtain a sub-electronic program guide (EPG) identifier.

Step 102: Receive a total EPG transmitted by a central front end, where the total EPG includes a plurality of sub-EPG identifiers and sub-EPGs each of which corresponds to one of the sub-EPG identifiers.

Step 103: Search the received total EPG for a sub-EPG corresponding to the obtained sub-EPG identifier and hide programs based on the sub-EPG.

To clarify the objects, technical solutions and advantages of the present invention, the present invention is further described in detail below with reference to the accompany drawings and the exemplary embodiments.

Figure 2:
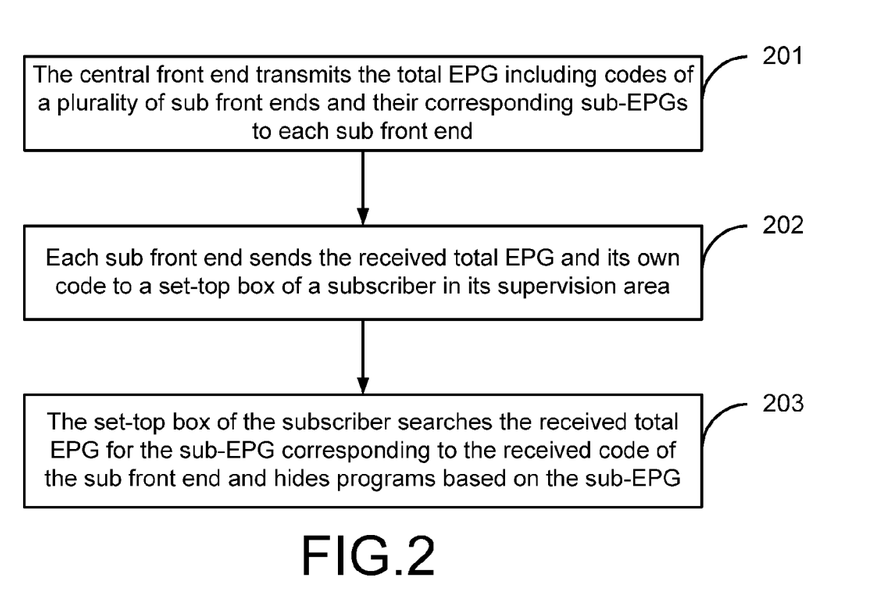
FIG. 2 is a flow chart of a first embodiment of the method for hiding programs of the present invention.

FIG. 2 is a flow chart of the first embodiment of the method for hiding programs of the present invention. As shown in FIG. 2, the method includes the following steps.

Step 201: The central front end transmits the total EPG including codes of a plurality of sub front ends and their corresponding sub-EPGs to each sub front end.

Step 202: Each sub front end sends the received total EPG and its own code to a set-top box of a subscriber in its supervision area.

Step 203: The set-top box of the subscriber searches the received total EPG for the sub-EPG corresponding to the received code of the sub front end and hides programs based on the sub-EPG.

In the step 203, when the set-top box of the subscriber hides the programs based on the sub-EPG, the set-top box may hide all the programs which are not included in the sub-EPG or all the programs which are included in the sub-EPG.

The programs may be hidden from a group of subscribers in the supervision area of each sub front end by using the method shown in FIG. 2.

As shown in FIG. 2, different sub front ends may supervise set-top boxes in different areas, and the code of a sub front end may be an area code of the area supervised by the sub front end. Different programs may be hidden from subscribers in different areas. That is, different programs may be restricted to be watched for subscribers in different areas. For example, different watching restrictions may be implemented in urban districts and suburbs. In addition, in the method shown in FIG. 2, to allocate sub-EPGs flexibly at the central front end, the relationship between the area code and the sub-EPG may be established via an eigenvalue in the total EPG. That is, two lists are established in the total EPG. In one list, one-to-one relationships between each area code and each eigenvalue are stored, and in another list, all the eigenvalues and their corresponding sub-EPGs are stored. Each sub-EPG includes all the information about the programs that may be searched for in its corresponding area. That is, a list of programs that may be watched in this area. Thus, when the programs that may be watched in a certain area are needed to be adjusted, only the sub-EPG corresponding to the eigenvalue is needed to be modified or replaced, where the eigenvalue corresponds to the area code of the area.

In the method shown in FIG. 2, a sub front end may send its own area code to aset-top box of a subscriber in its area by modifying the area code of the central front end in the total EPG to the area code of the sub front end and transmitting the total EPG to the set-top box of the subscriber in its area.

After receiving the total EPG, the set-top box of the subscriber obtains the area code of its area from the total EPG, then searches the list including the corresponding relationship between each area code and each eigenvalue for the eigenvalue corresponding to the area code of its area, and then searches the list including all the eigenvalues and their corresponding sub-EPGs for the corresponding sub-EPG based on the found eigenvalue and hides programs based on the sub-EPG.

In this embodiment, the area code may be an identification value (N_ID) of a network information table (NIT), and the eigenvalue may be an identification value (B_ID) of a group information table (BAT).

Taking the Shenzhen city network as an example, the method illustrated in FIG. 2 is further described in detail below. The broadcast and television station does not desire that the subscribers in the Longgang district watch two programs, Phoenix Satellite Television and National Geography, which are transmitted via the Shenzhen city network, and the subscribers in other districts may watch the two programs. Assuming that the N_ID of the central front end of the city network is 1 and the N_ID of the Longgang district is 5. The central front end of the city network inserts a private descriptor tag=0x85 into the NIT in an EPG transmitted at its center frequency, such as 259 MHz. The descriptor includes a one-to-one correspondence between the N_ID and the B_ID, for example, N_ID=5 corresponds to B_ID=0x7011. The NIT is part of the EPG. A BAT table corresponding to B_ID=0x7011 is inserted in the EPG. Service addresses (service_id) of all the programs that may be searched for in the Longgang district, except the Phoenix Satellite Television and National Geography, are described in the BAT table. After receiving the EPG at the center frequency 259 MHz, a sub front end in the Longgang district modifies N_ID=1 to N_ID=5 and transmits it to all the set-top boxes of subscribers in the Longgang district. After receiving the NIT at the center frequency 259 MHz, the set-top boxes of the subscribers in the Longgang district parse B_ID=0x7011 based on N_ID=5 and parse the BAT table corresponding to B_ID=0x7011, and searches for programs based on the BAT able to filter out all the programs that are not described in the BAT table. Thus, the subscribers in the Longgang district cannot find out the Phoenix Satellite Television and National Geography.

Figure 3:
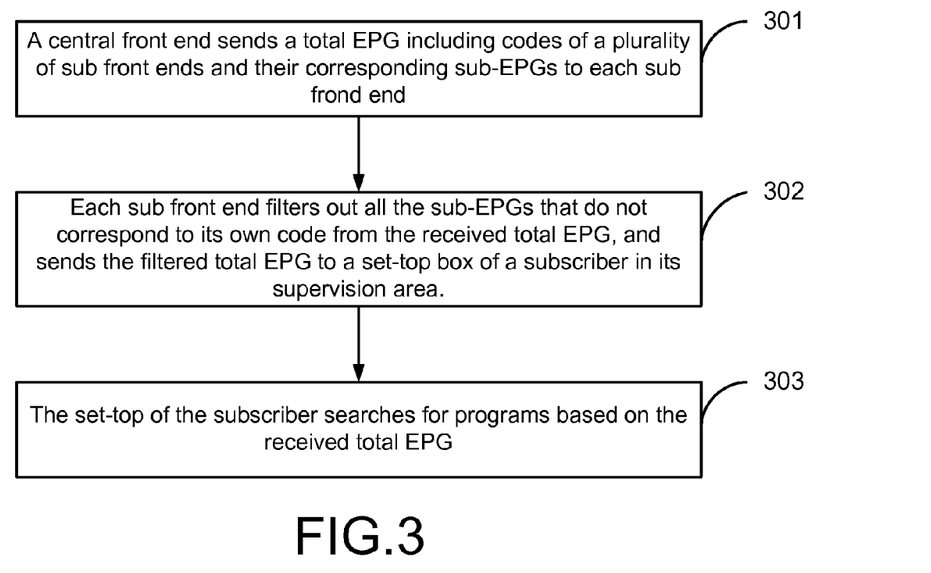
FIG. 3 is a flow chart of a second embodiment of the method for hiding programs of the present invention.

FIG. 3 is a flow chart of the second embodiment of the method for hiding programs of the present invention. As shown in FIG. 3, the method includes the following steps.

Step 301: A central front end sends a total EPG including codes of a plurality of sub front ends and their corresponding sub-EPGs to each sub frond end.

Step 302: Each sub front end filters out all the sub-EPGs that do not correspond to its own code from the received total EPG, and sends the filtered total EPG to the set-top boxes of subscribers in its supervision area.

In the step 302, each sub front end filtering out all the sub-EPGs that do not correspond to its own code from the total EPG means that the sub front end reserves only the sub-EPG corresponding to its own code in the total EPG and deletes all other sub-EPGs.

Step 303: The set-top of the subscriber searches for programs based on the received total EPG.

In the embodiment shown in FIG. 3, each sub front end may supervise set-top boxes in different areas and the code of the sub front end may be an area code of the area supervised by the sub front end such that different programs may be hidden from subscribers in different areas. Additionally, in the embodiment shown in FIG. 3, program hiding is implemented from the original source by using filtering function of the sub front end, thereby ensuring watching restriction. Furthermore, in the embodiment shown in FIG. 3, like the method illustrated in FIG. 2, to allocate sub-EPGs flexibly at the front end, the relationship between the area code and the sub-EPG may be established in a total EPG via an eigenvalue, which is not be repeated herein.

Figure 4:
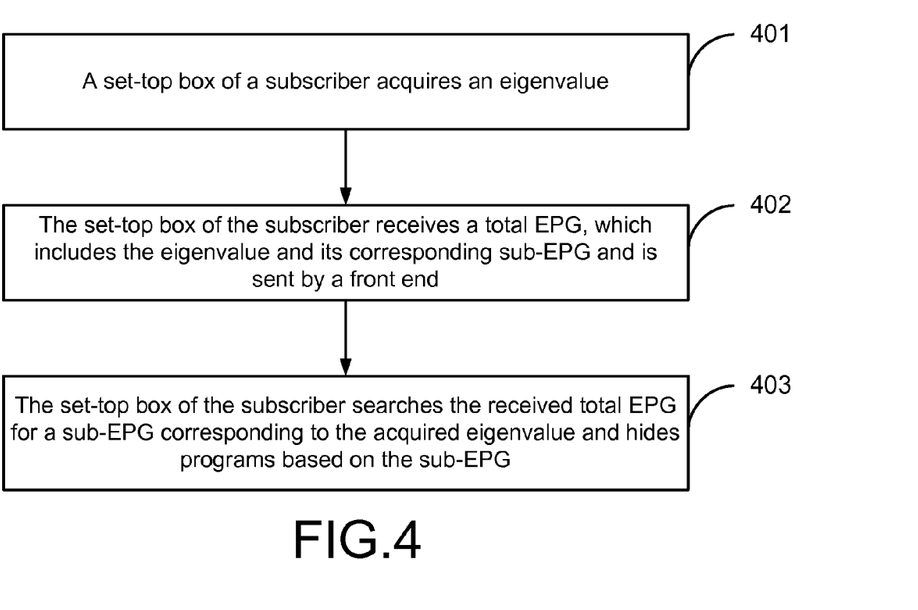
FIG. 4 is a flow chart of a third embodiment of the method for hiding programs of the present invention.

FIG. 4 is a flow chart of the third embodiment of the method for hiding programs of the present invention. As shown in FIG. 4, the method includes the following steps.

Step 401: A set-top box of a subscriber acquires an eigenvalue.

Step 402: The set-top box of the subscriber receives a total EPG, which includes the eigenvalue and its corresponding sub-EPG and is sent by a front end.

Step 403: The set-top box of the subscriber searches the received total EPG for a sub-EPG corresponding to the acquired eigenvalue and hides programs based on the sub-EPG.

The programs may be hidden from a particular group or person, such as, government agencies and hotels.

In the method shown in FIG. 4, a smart card including the eigenvalue may be assigned to the subscriber and the set-top box may read the eigenvalue from the smart card including the eigenvalue.

Taking the Shenzhen city network as an example, the method illustrated in FIG. 4 is further described in detail below. The Shenzhen broadcast and television station does not desire that the subscriber A watch the Phoenix Satellite Television. In this case, an eigenvalue, such as, B_ID=0x7011, may be written into a smart card distributed to the subscriber A, and an EPG transmitted by the city network includes a BAT table corresponding to B_ID=0x7011. The BAT table contains Service_id of all the programs that the subscriber A may search for excluding the Phoenix Satellite Television. The set-top box of the subscriber A first reads the eigenvalue 0x7011 from the smart card and stores it, then finds out the BAT table corresponding to the eigenvalue 0x7011 from the received EPG, and searches for programs based on the BAT table to filter out all the programs that are not described in the BAT table. Thus, the subscriber A cannot find out the Phoenix Satellite Television.

In the embodiment shown in FIG. 4, when the set-top box of a subscriber is located in the supervision area of a certain sub front end, for example, when there is a sub front end in the area where the set-top box of the subscriber is located, the sub front end may filter out all the sub-EPGs that do not belong to the area after receiving the total EPG transmitted by the central front end, and transmit the filtered EPG to the set-top box of the subscriber in its supervision area, thus ensuring that the subscriber in the area can only watch the programs which are permitted to be watched in the area. For example, the Longgang district does not desire that the programs be found out based on the eigenvalue that does not belong to the Longgang district after the smart card of the other district is brought in the Longgang district. Therefore, after receiving the total EPG transmitted by the central front end of the city network, the sub front end of the Longgang district filters out directly the sub-EPGs that do not belong to the Longgang district and transmits the filtered total EPG to the set-top box of the subscriber in the Longgang district. Thus, the smart card, which includes the eigenvalue that does not belong to the Longgang district, cannot be used in the Longgang district.

Based on the method for hiding programs, a system, set-top box, central front end and sub front end for hiding programs according to the embodiments of the present invention are described below.

Figure 5:
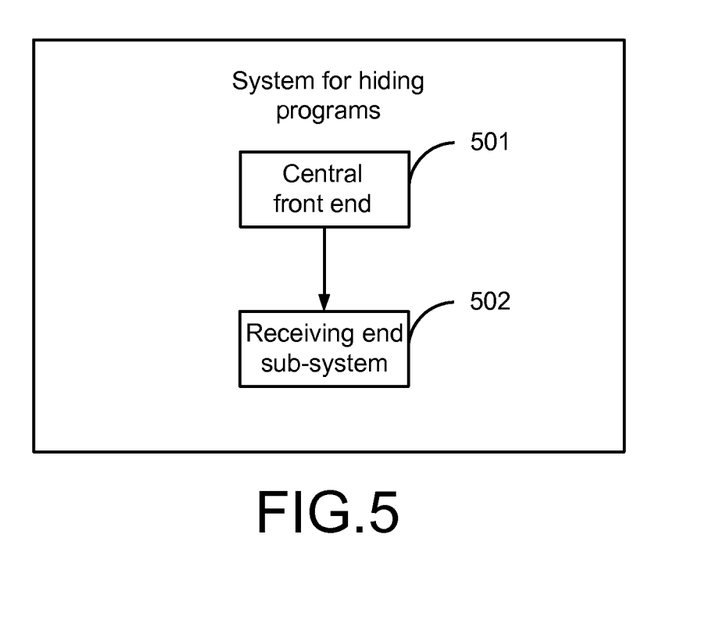
FIG. 5 is a structural diagram of a system for hiding programs in accordance with one embodiment of the present invention.

FIG. 5 is a structural diagram of a system for hiding programs in accordance with one embodiment of the present invention. As shown in FIG. 5, the system includes a central front end 501 and a receiving end sub-system 502.

The central front end 501 is configured to transmit a total EPG, which includes a plurality of sub-EPG identifiers and sub-EPGs each of which corresponds to one of the sub-EPG identifiers, to the receiving end sub-system 502.

The receiving end sub-system 502 is configured to obtain a sub-EPG identifier, search the total EPG transmitted by the central front end for a sub-EPG corresponding to the obtained sub-EPG identifier, and hide programs based on the sub-EPG.

In the system shown in FIG. 5, the receiving end sub-system 502 may include more than one sub front ends and set-top box of subscriber in the supervision area of each sub front end. In this case, the sub-EPG identifier is a code of a sub front end. The sub front end is configured to receive the total EPG sent by the central front end and send the received total EPG and its own code to the set-top box in its supervision area. The set-top box is configured to search the received total EPG for the sub-EPG corresponding to the received code of the sub front end and hide programs based on the sub-EPG.

In the system shown in FIG. 5, the receiving end sub-system 502 may include more than one sub front ends and set-top box of subscriber in the supervision area of each sub front end. In this case, the sub-EPG identifier is a code of the sub front end. The sub front end is configured to filter out all the sub-EPGs except the specified sub-EPG from the received total EPG and transmit the filtered total EPG to the set-top box in its supervision area. The specified sub-EPG is the sub-EPG corresponding to the code of the sub front end. The set-top box is configured to receive the total EPG sent by the sub front end and search for programs based on the sub-EPG.

In the system shown in FIG. 5, the receiving end sub-system 502 may include set-top box of subscriber. In this case, the sub-EPG identifier is an eigenvalue, and the set-top box is configured to obtain the eigenvalue, receive a total EPG sent by a central front end, search the received total EPG for a sub-EPG corresponding to the obtained eigenvalue and hide programs based on the sub-EPG.

Figure 6:
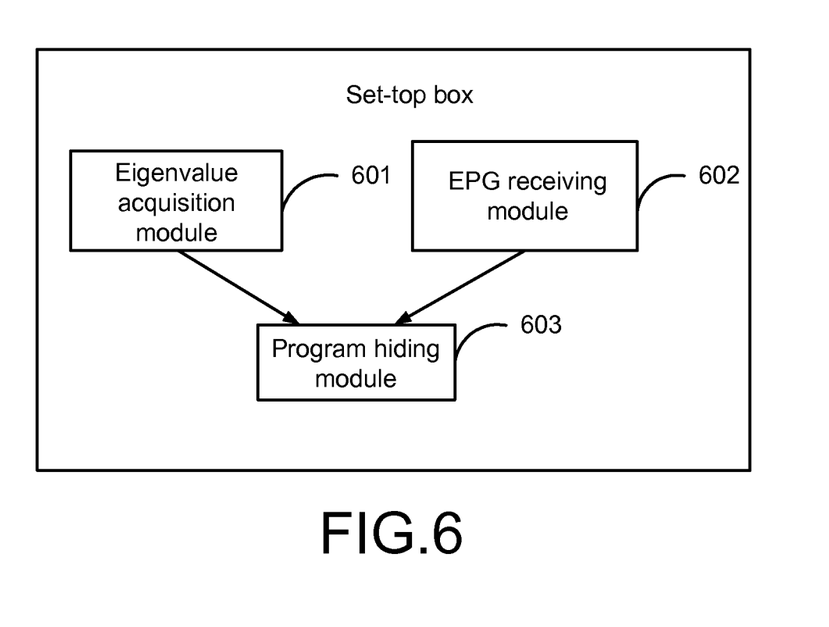
FIG. 6 is a structural diagram of a set-top box in accordance with one embodiment of the present invention.

FIG. 6 is a structural diagram of a set-top box in accordance with one embodiment of the present invention. As shown in FIG. 6, the set-top box includes an eigenvalue acquisition module 601, an EPG receiving module 602 and a program hiding module 603.

The eigenvalue acquisition module 601 is configured to acquire an eigenvalue and send the eigenvalue to the program hiding module 603.

The EPG receiving module 602 is configured to receive a total EPG including the eigenvalue and its corresponding sub-EPG, and send the total EPG to the program hiding module 603.

The program hiding module 603 is configured to search the received total EPG for a sub-EPG corresponding to the received eigenvalue and hide programs based on the sub-EPG.

Figure 7:
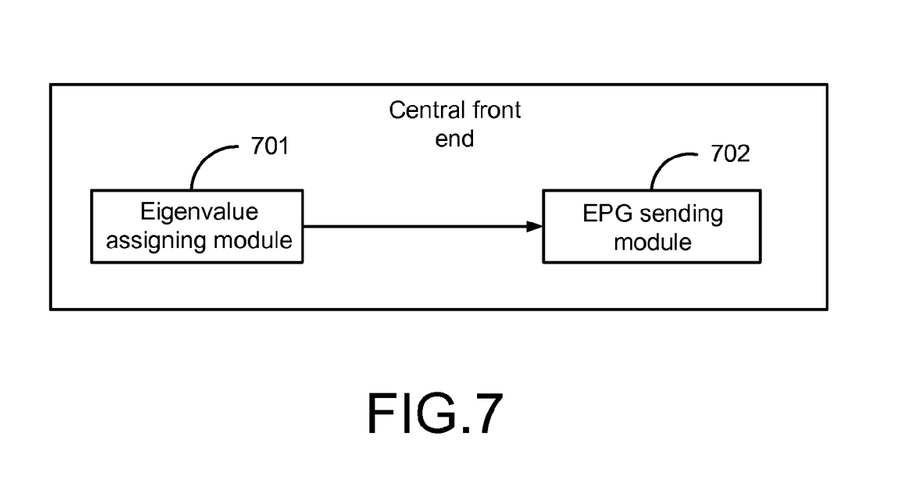
FIG. 7 is a structural diagram of a front end for hiding programs in accordance with one embodiment of the present invention.

FIG. 7 is a structural diagram of a central front end in accordance with one embodiment of the present invention. As shown in FIG. 7, the central front end includes an eigenvalue assigning module 701 and an EPG sending module 702.

The eigenvalue assigning module 701 is configured to assign different eigenvalues to set-top boxes of different subscribers and send the assigned eigenvalues to the EPG sending module 702.

The EPG sending module 702 is configured to send a total EPG, which includes the assigned eigenvalues and sub-EPGs each of which corresponds to one of the eigenvalues, to set-top boxes of the subscribers.

Figure 8:
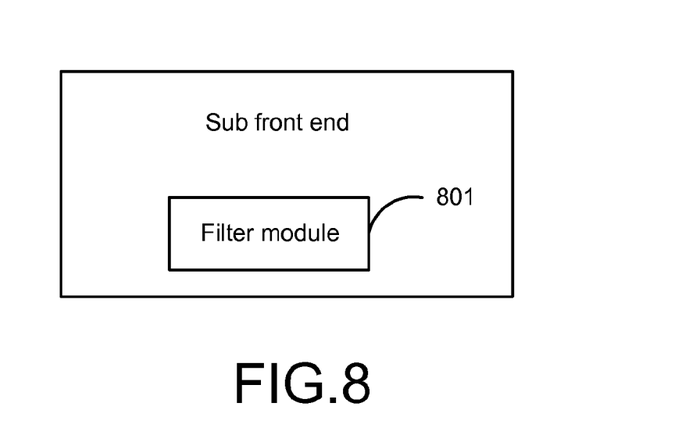
FIG. 8 is a structural diagram of a sub frond end for hiding programs in accordance with one embodiment of the present invention.

FIG. 8 is a structural diagram of a sub frond end in accordance with one embodiment of the present invention. As shown in FIG. 8, the sub front end includes a filter module 801 configured to receive a total EPG including the codes of the sub front ends and their corresponding sub-EPGs, filter out all the sub-EPGs except a specified sub-EPG from the received total EPG, and transmit the filtered total EPG to set-top box of a subscriber in its supervision area, the specified sub-EPG is the sub-EPG corresponding to the code of the sub front end.

In summary, in the embodiments of the present invention, with the technology solution, in which the central front end sends the total EPG including the area code of each area and its corresponding sub-EPG to the sub front end in each area, the sub front end in each area sends the received total EPG and its own area code to the set-top box of the subscriber in the area, and the set-top box searches the received total EPG for the sub-EPG corresponding to the received area code and hides programs based on the sub-EPG, regional program hiding is implemented, thereby carrying out watching restriction for different programs in different areas. In addition, with the technology solution, in which the set-top box of the subscriber acquires the eigenvalue, receives the total EPG which includes the eigenvalue and its corresponding sub-EPG and is sent by the front end, searches the total EPG for the sub-EPG corresponding to the acquired eigenvalue and hides programs based on the sub-EPG, the programs are hidden from particular subscribers, thereby making up for the deficiency of the regional program hiding solution. Furthermore, the sub front end filters out all sub-EPGs except the sub-EPG that belongs to its area from the total EPG and then transmits the filtered total EPG to the set-top box of the subscriber, thereby hiding program from the original source.

Only the exemplary embodiments of the present invention are described hereinabove and not intended to limit the protection scope of the present invention. Any modification, equivalent replacement and improvement made within the spirit and principle of the present invention should be included in the protection scope of the present invention.

What is claimed is:

1. A method for hiding programs, comprising:
   obtaining program guide (EPG) identifier;
   receiving a total EPG transmitted by a central front end, wherein the total EPG includes sub-EPG identifiers and sub-EPGs each of which corresponds to one of the sub-EPG identifiers;
   searching the received total EPG for a sub-EPG corresponding to the obtained sub-EPG identifier; and
   hiding programs based on the found sub-EPG; and wherein the sub-EPG identifier is a code of a sub front end;
   the obtaining the sub-EPG identifier and the receiving the total EPG transmitted by the central front end comprise:
   receiving, by the sub front end, the total EPG, wherein the total EPG includes codes of sub front ends and the sub-EPGs each of which corresponds to one of the codes of sub front ends and the total EPG is sent by the central front end; and
   sending, by the sub front end, the received total EPG and its own code to a set-top box of a subscriber in the supervision area of the sub front end; and
   the searching the received total EPG for a sub-EPG corresponding to the obtained sub-EPG identifier and the hiding programs based on the found sub-EPG further comprise:
   searching, by the set-top box of the subscriber, the received total EPG for a sub-EPG corresponding to the received code of the sub front end and hiding programs based on the sub-EPG.

2. The method according to claim 1, wherein the sub front ends supervise set-top boxes of subscribers in different areas separately and the code of the sub front end is an area code of the area supervised by the sub front end.

3. The method according to claim 2, wherein
   the total EPG comprises relationships between area codes and eigenvalues of areas, and between eigenvalues of areas and the sub-EPGs each of which corresponds to one of the eigenvalues; and
   the searching, by the set-top box of the subscriber, the received total EPG for the sub-EPG corresponding to the received code of the sub front end comprises:
   searching, by the set-top box of the subscriber, the received total EPG for an eigenvalue corresponding to the received area code and searching the total EPG for the sub-EPG corresponding to the eigenvalue.

4. The method according to claim 2, wherein
   the total EPG further comprises an area code corresponding to the central front end; and
   the sending, by the sub front end, the received total EPG and its own code to the set-top box of the subscriber in its supervision area comprises:
   modifying, by the sub front end in each area, the area code corresponding to the central front end in the received total EPG to the area code of the sub front end and sending the modified area code to the set-top box of the subscriber in the area of the sub front end.

5. The method according to claim 1, wherein
   the searching the received total EPG for a sub-EPG corresponding to the obtained sub-EPG identifier and the hiding programs based on the found sub-EPG comprise:
   filtering out, by the sub front end, all the sub-EPGs except a specified sub-EPG from the received total EPG, and transmitting the filtered total EPG to the set-top box of the subscriber in the supervision area of the sub front end, wherein the specified sub-EPG is a sub-EPG corresponding to the code of the sub front end.

6. The method according to claim 1, wherein
   the hiding programs based on the found sub-EPG comprises:
   hiding all the programs which are not included in the sub-EPG; or
   hiding all the programs which are included in the sub-EPG.

7. A method for hiding programs, comprising:
   obtaining a sub-electronic program guide (EPG) identifier;
   receiving a total EPG transmitted by a central front end, wherein the total EPG includes sub-EPG identifiers and sub-EPGs each of which corresponds to one of the sub-EPG identifiers;
   searching the received total EPG for a sub-EPG corresponding to the obtained sub-EPG identifier; and hiding programs based on the found sub-EPG; and wherein the sub-EPG identifier is an eigenvalue;

the obtaining the sub-EPG identifier and the receiving the total EPG transmitted by the central front end comprise: obtaining, by a set-top box of a subscriber, the eigenvalue, and receiving the total EPG sent by the central front end; and the searching the received total EPG for a sub-EPG corresponding to the obtained sub-EPG identifier and the hiding programs based on the found sub-EPG further comprise:

searching, by the set-top box of the subscriber, the received total EPG for the sub-EPG corresponding to the obtained eigenvalue and hiding programs based on the sub-EPG.

8. The method according to claim 7, wherein
the obtaining, by a set-top box of a subscriber, the eigenvalue comprises:
reading, by the set-top box of the subscriber, the eigenvalue from a smart card including the eigenvalue.

9. The method according to claim 7, wherein
the hiding programs based on the found sub-EPG comprises:
hiding all the programs which are not included in the sub-EPG; or
hiding all the programs which are included in the sub-EPG.

10. A system for hiding programs, comprising:
a receiving end sub-system, configured to obtain a sub-electronic program guide (EPG) identifier, receive a total EPG transmitted by a central front end, search the total EPG transmitted by the central front end for a sub-EPG corresponding to the obtained sub-EPG identifier and hide programs based on the found sub-EPG; wherein the total EPG includes sub-EPG identifiers and sub-EPGs each of which corresponds to one of the sub-EPG identifiers;

the central front end, configured to send the total EPG to the receiving end sub-system;

wherein the receiving end sub-system comprises more than one sub front ends and set-top boxes of subscriber in the supervision area of each sub front end, the sub-EPG identifier is a code of a sub front end of the more than one sub front ends, and wherein the sub front end is configured to receive the total EPG sent by the central front end and send the received total EPG and the code of the sub front end to the set-top boxes of subscriber in its supervision area; and each of the set-top boxes of subscriber is configured to search the received total EPG for the sub-EPG corresponding to the received code of the sub front end and hide programs based on the found sub-EPG.

11. The system according to claim 10, wherein the receiving end sub-system comprises a set-top box of subscriber and the sub-EPG identifier is an eigenvalue;

the set-top box of subscriber is configured to obtain an eigenvalue, receive the total EPG sent by the central front end, search the received total EPG for a sub-EPG corresponding to the obtained eigenvalue and hide programs based on the found sub-EPG.

12. A system for hiding programs, comprising:
a receiving end sub-system, configured to obtain a sub-electronic program guide (EPG) identifier, receive a total EPG transmitted by a central front end, search the total EPG transmitted by the central front end for a sub-EPG corresponding to the obtained sub-EPG identifier and hide programs based on the found sub-EPG; wherein the total EPG includes sub-EPG identifiers and sub-EPGs each of which corresponds to one of the sub-EPG identifiers;

the central front end, configured to send the total EPG to the receiving end sub-system;

wherein the receiving end sub-system comprises more than one sub front ends and set-top boxes of subscriber in the supervision area of each sub front end, and the sub-EPG identifier is a code of a sub front end of the more than one sub front ends, and wherein the sub front end is configured to filter out all the sub-EPGs except the specified sub-EPG from the received total EPG and transmit the filtered total EPG to the set-top boxes of subscriber in supervision area of the sub front end, and the specified sub-EPG is a sub-EPG corresponding to the code of the sub front end; and each of the set-top boxes of subscriber is configured to receive the total EPG sent by the sub front end and search for programs based on the received total EPG.

13. The system according to claim 12, wherein the receiving end sub-system comprises a set-top box of subscriber and the sub-EPG identifier is an eigenvalue;

the set-top box of subscriber is configured to obtain an eigenvalue, receive the total EPG sent by the central front end, search the received total EPG for a sub-EPG corresponding to the obtained eigenvalue and hide programs based on the found sub-EPG.

* * * * *

UNITED STATES PATENT AND TRADEMARK OFFICE
CERTIFICATE OF CORRECTION

PATENT NO.        : 8,499,322 B2
APPLICATION NO.   : 12/757625
DATED             : July 30, 2013
INVENTOR(S)       : Jian Wang Page 1 of 1

It is certified that error appears in the above-identified patent and that said Letters Patent is hereby corrected as shown below:

Title page, item (75), Inventor's City "Guangdong (CN)" should read -- Shenzhen (CN) --.

In the claims:

Claim 1, Column 7, Line 57 "obtaining program guide (EPG)" should read

-- obtaining a sub-electronic program guide (EPG) --.

Signed and Sealed this
First Day of October, 2013

Teresa Stanek Rea
*Deputy Director of the United States Patent and Trademark Office*